United States Patent [19]

Togawa et al.

[11] Patent Number: 5,283,838
[45] Date of Patent: Feb. 1, 1994

[54] NEURAL NETWORK APPARATUS

[75] Inventors: Fumio Togawa, Hillsboro, Oreg.; Toru Ueda, Nara, Japan; Takashi Aramaki, Hillsboro, Oreg.; Yasushi Ishizuka, Yamatokoriyama, Japan

[73] Assignee: Sharp Kabushiki Kaisha, Osaka, Japan

[21] Appl. No.: 685,596

[22] Filed: Apr. 15, 1991

[30] Foreign Application Priority Data

Apr. 16, 1990 [JP] Japan .................................. 2-99974

[51] Int. Cl.$^5$ .............................................. G06K 9/00
[52] U.S. Cl. ................................................... 382/14
[58] Field of Search ..................... 382/14, 15; 395/21, 395/23

[56] References Cited

U.S. PATENT DOCUMENTS

| | | | |
|---|---|---|---|
| 4,479,241 | 10/1984 | Buckley | 382/15 |
| 5,048,100 | 9/1991 | Kuperstein | 382/15 |
| 5,063,601 | 11/1991 | Hayduk | 382/14 |

OTHER PUBLICATIONS

Lippmann, "An Introduction to Computing with Neural Nets", *IEEE ASSP Magazine*, Apr. 1987, pp. 4–22.

*Primary Examiner*—Leo H. Boudreau
*Attorney, Agent, or Firm*—Morrison & Foerster

[57] ABSTRACT

When performing learning for a neural network, a plurality of learning vectors which belong to an arbitrary category are used, and self-organization learning in the category is carried out. As a result, the plurality of learning vectors which belong to the category are automatically clustered, and the contents of weight vectors in the neural network are set to representative vectors which exhibit common features of the learning vectors of each cluster. Then, teacher-supervised learning is carried out for the neural network, using the thus set contents of the weight vectors as initial values thereof. In the learning process, an initial value of each weight vector is set to the representative vector of each cluster obtained by clustering. Therefore, the number of calculations required until the teacher-supervised learning is converged is greatly reduced.

11 Claims, 13 Drawing Sheets

SELF-ORGANIZATION IN CATEGORY

TEACHER-SUPERVISED LEARNING

NEURAL NETWORK APPARATUS

BACKGROUND OF THE INVENTION

1. Field of the Invention

The invention relates to an apparatus having a neural network and a method of performing a learning procedure in a neural network.

2. Description of the Prior Art

Learning of a neural network is carried out as follows. Learning data indicative of certain known information are input into a neural network constructed by interconnecting nodes which correspond to neurons in a human brain. Then, by successively changing each value of the connection weight of the nodes (hereinafter referred to as "weight"), the information included in the learning data is learned in the weight system.

Generally, when such learning of a neural network is carried out, a random value is provided as an initial value for each weight for changing the value of the weight. This provision makes it possible to handle a set of input learning data having any value (i.e., any information), when learning information included in the learning data.

Conventionally, if a category to which information indicated by learning data belong is unknown, learning of a neural network is carried out by using a self-organization learning (self-learning) procedure such as the self-organized formation of feature maps by Kohonen or Adaptive Resonance Theory by Grossberg. On the other hand, if a category to which information indicated by learning data belong is known, learning of a neural network is carried out by using a teacher-supervised learning procedure such as the error back-propagation (back-propagation) by Rumelhart or learning vector quantization 2 (LVQ2) by Kohonen.

The learning procedure in either case where the category is unknown or known requires a huge number of calculations until the learning is converged, because respective values of the weights are successively changed depending upon the degree of similarity in the contents between the input learning data and each of the weights, or depending upon the degree of difference in the contents between the information indicated by the input learning data and the information indicated by the output data associated with the input learning data. If a state becomes such that the input learning data is very similar to the weight, or that the contents of the information indicated by the input learning data are very similar to the contents of the information indicated by the output data, the learning is judged to be converged. Such a state is called a learned state.

In order to reduce the number of calculations, an alternative method is employed. In this method, a random value is not used as an initial weight value, and a learning data set is previously clustered by the K-means method (which is a conventional statistical clustering method) or by other methods. Then, using a representative vector or average vector of the respective cluster obtained, each weight value is initialized. According to this alternative method, the number of calculations required until the learning is converged can be greatly reduced.

However, because the algorithm of the K-means method used in clustering the learning data set and an algorithm of the calculation used in learning of the neural network are quite distinctive from each other, it is difficult to use the algorithm of the K-means method in the learning of the neural network. Therefore, learning data are first clustered by the K-means method, and a weight value is initialized by using a resulting representative vector, average vector, etc. Then, learning of the neural network is performed. Since the learning of the neural network requires these two steps, there arises a problem that the learning process is very complicated.

Thus, the invention described herein makes possible the objectives of:

(1) providing an apparatus having a neural network in which learning can be readily performed;

(2) providing an apparatus having a neural network in which learning can be performed with a reduced number of calculations;

(3) providing a method of performing a learning procedure in a neural network by which the neural network can be readily brought into a learned state; and (4) providing a method of performing a learning procedure in a neural network by which the neural network can be brought into a learned state with a reduced number of calculations.

SUMMARY OF THE INVENTION

The neural network apparatus of this invention, which overcomes the above-discussed and numerous other disadvantages and deficiencies of the prior art, comprises self-organization learning means for performing self-organization learning in a category to which a plurality of weight vectors are allocated and a plurality of learning vectors belong, said self-organization learning means having modification means for modifying the contents of a predetermined number of said weight vectors which are in the vicinity of one of said learning vectors, toward said one learning vector, said apparatus further comprising teacher-supervised learning means for performing teacher-supervised learning against said weight vectors, using said modified contents as an initial value.

In the above configuration, said predetermined number may be one, or alternatively two or more.

Preferably, said self-organization learning means performs self-organization learning in all of categories to which said plurality of learning vectors belong.

In preferred embodiments, said apparatus comprises a Kohonen type neural network. The apparatus may comprise: output nodes allocated to said category; and an input node through which said learning vectors are input.

In preferred embodiments, said apparatus comprises a perceptron type neural network. The apparatus may comprise: intermediate layer nodes allocated to said category; and input layer nodes through which said learning vectors are input.

The method according to the invention comprises the steps of: performing self-organization learning in a category to which a plurality of weight vectors are allocated and a plurality of learning vectors belong, while modifying the contents of a predetermined number of said weight vectors which are in the vicinity of one of said learning vectors, toward said one learning vector; and performing teacher-supervised learning against said weight vectors, using said modified contents as an initial value.

Both the self-organization learning step and teacher-supervised learning step may be conducted substantially simultaneously.

BRIEF DESCRIPTION OF THE DRAWINGS

This invention may be better understood and its numerous objects and advantages will become apparent to those skilled in the art by reference to the accompanying drawings as follows.

DESCRIPTION OF THE PREFERRED EMBODIMENTS

According to the invention, clustering for a learning data set is carried out without using a statistical clustering method, and then, using the result, weight value initialization of the neural network is performed.

When a neural network is used in recognizing printed characters, for example, learning data include character image data of different fonts for the same character code (i.e., for the same category). When a neural network is used in recognizing hand-written characters, learning data include character image data of various styles for the same character code depending upon different writer's peculiarities. In speech recognition, there are different tones based on speakers or surroundings for the same phoneme code.

Learning vectors Xi indicative of the ith learning data pattern information are assumed to belong to one of categories Ck ($1 \leq k \leq K$) of character codes, phoneme codes, or other kinds of codes. The learning vectors Xi in an arbitrary category Ck (i=kj, and j is the number of a learning vector in the category Ck) include different fonts, peculiarities of writing, or tones. Therefore, in each of the embodiments described below, learning vectors xkj which belong to a certain category Ck are clustered by self-organization learning of a neural network, so as to produce a representative vector for each cluster.

Figure 1:
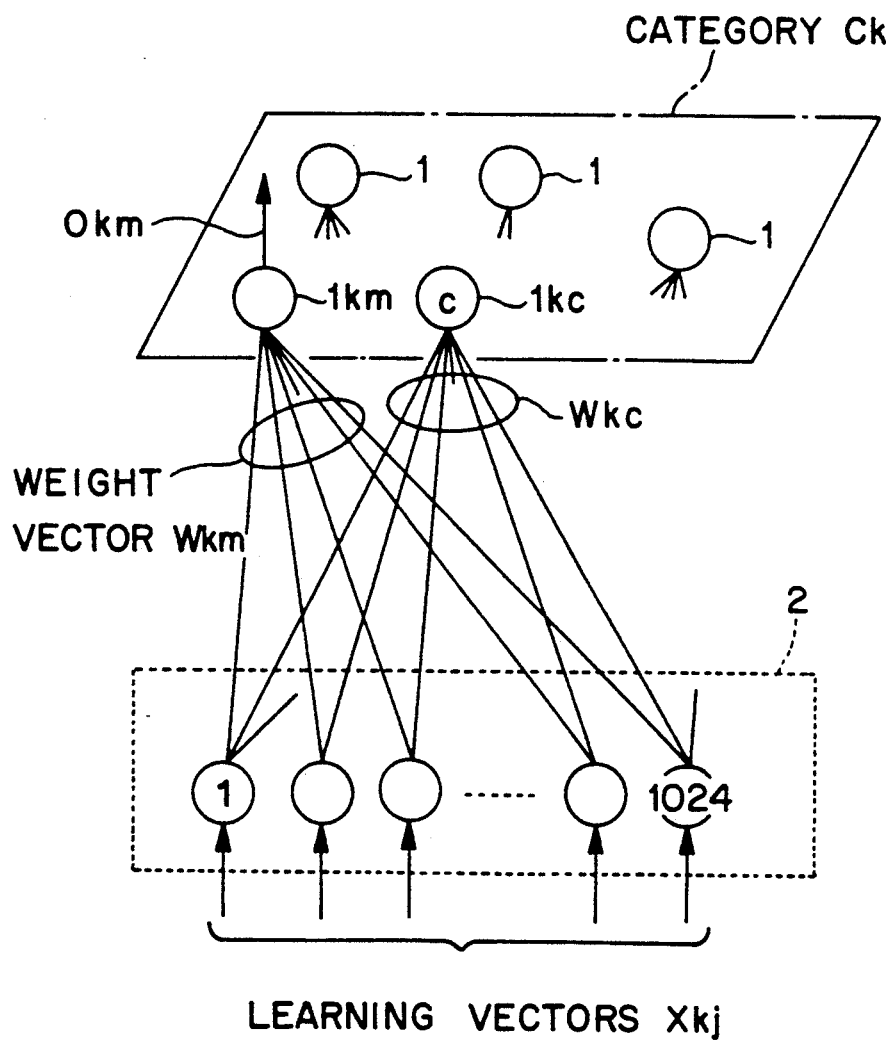
FIG. 1 is diagram illustrating a neural network according to the invention.

FIG. 1 diagrammatically illustrates a concept of a Kohonen type neural network used in preferred embodiments of the invention. This Kohonen type neural network has a structure in which all output nodes 1, 1, ... are connected to an input node 2. The output nodes 1, 1, ... are allocated to one category Ck in a category group of the objects to be identified. Hereinafter, each of the output nodes 1 is identified by a suffix composed of the category number k of the category Ck and the output node number m allocated to each of the output nodes 1, 1, ... in the category Ck. For example, the output node 1 km indicates the mth output node in the output nodes allocated to the kth category. In the example shown in FIG. 1, five output nodes 1 are allocated to one category (i.e., $1 \leq m \leq 5$).

The learning vectors Xi are input into the input node 2. Then, an output value is calculated for each of the connections, based on the learning vectors Xi and weight vectors W and in accordance with a predetermined algorithm described below. The weight vectors W correspond to the output nodes 1. The weight vector corresponding to the output node 1 km is represented by "Wkm".

Figure 2:
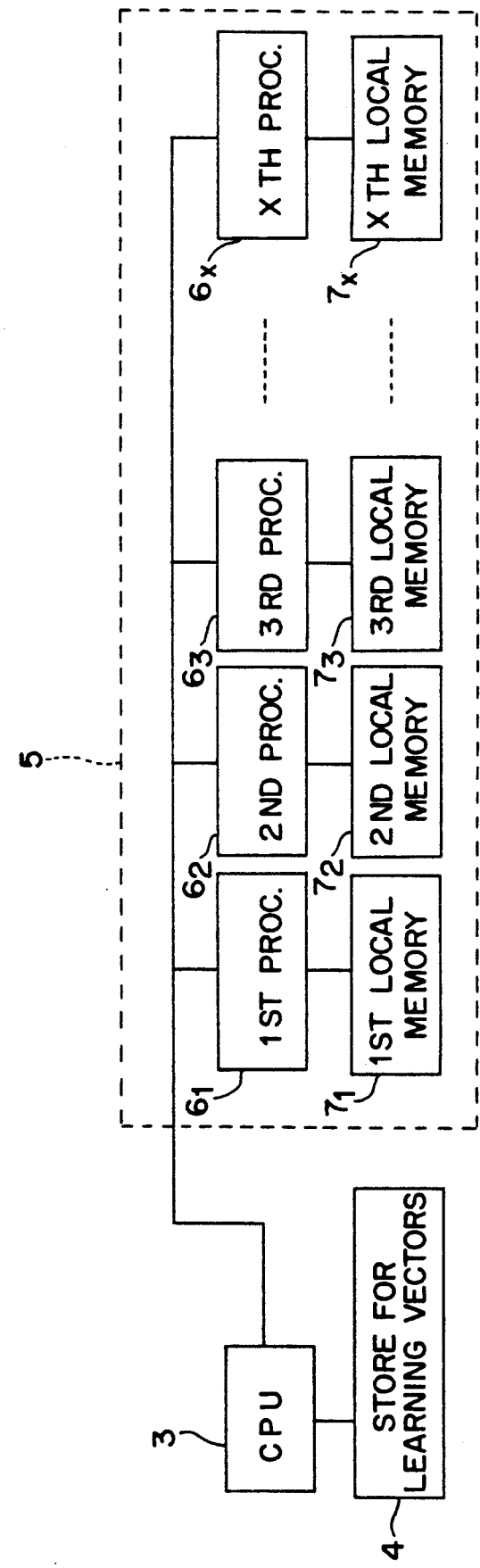
FIG. 2 is a block diagram of the apparatus having the neural network of FIG. 1.

FIG. 2 shows a learning apparatus having a Kohonen type neural network 5. The learning apparatus of FIG. 2 comprises a learning data memory 4 for storing the learning vectors Xi used in learning of the neural network. The neural network 5 comprises first to xth high-speed processors $6_1$ to $6_x$, each of which calculates the degree of similarity between the learning vector Xi stored in the learning data memory 4 and the weight vector W. First to xth local memories $7_1$ to $7_x$ for storing the weight vectors W are respectively coupled to the first to xth high-speed processors $6_1$ to $6_x$. A CPU (Central Processing Unit) 3 controls the learning data memory 4, the high-speed processors $6_1$ to $6_x$ and the local memories $7_1$ to $7_x$.

Each of the high-speed processors $6_1$ to $6_x$ constitutes one or more of the output nodes in the Kohonen type neural network shown in FIG. 1. In other words, for example, if the first high-speed processor $6_1$ constitutes a certain output node 1 km, the first local memory $7_1$ stores a weight vector Wkm for the connection between the output node 1 km and the input node 2. When a learning vector Xkj is input into the input node 2, the first high-speed processor $6_1$ reads out the weight vector Wkm stored in the first local memory $7_1$, and calculates the degrees of similarity between the weight vector Wkm and the learning vector Xkj. The result is output as an output value Okm from the output node 1 km.

In a first embodiment, self-organization learning of the neural network is performed so that a learning vector set for each category C is first clustered and weight vectors are initialized. Then, using teacher-supervised learning, learning of the neural network is carried out.

Figure 3:
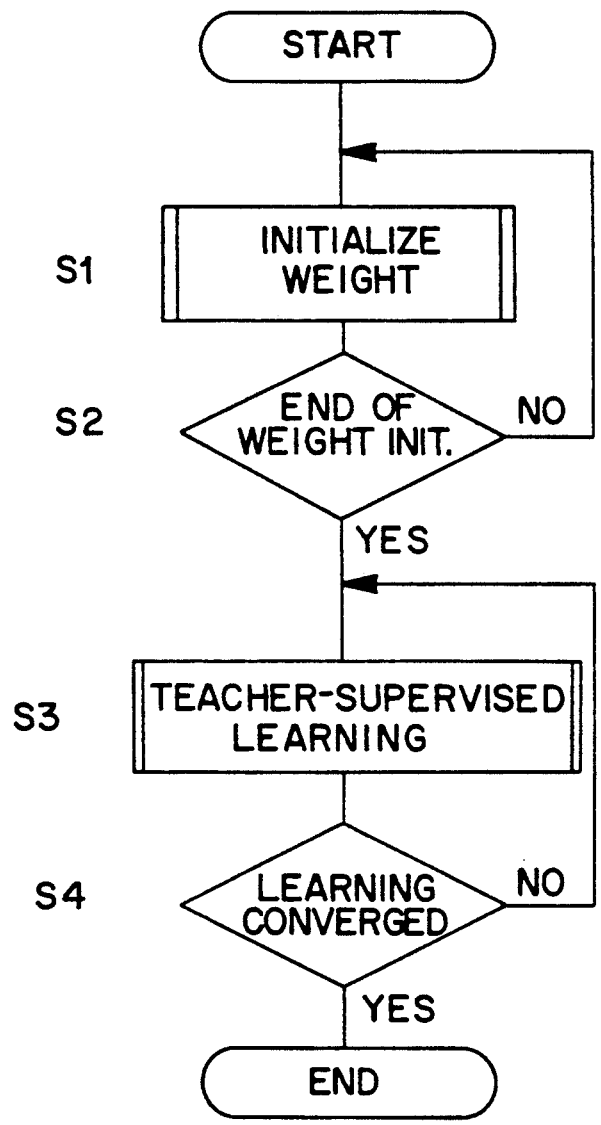
FIG. 3 is a flow chart illustrating a learning operation in the apparatus of FIG. 2.

FIG. 3 shows the flow of a learning operation implemented in the CPU 3 of this embodiment.

In step S1, self-organization learning is carried out in an arbitrary category among a plurality of categories to which learning vectors belong, so as to cluster the learning vector set which belongs to that category. Then, a weight vector for the category is initialized so as to become a representative vector of the obtained cluster.

In step S2, it is judged whether initialization of weight vectors for every category to which learning vectors constituting a learning data set belong has been completed or not. If NO, then the process returns to step S1, and weight vectors for the next category are initialized. If YES, then the process proceeds to step S3.

In step S3, using the initial value of the weight vector obtained in step S1, teacher-supervised learning is conducted.

In step S4, it is judged whether the degrees of similarity between learning vectors and weight vectors which were calculated by the high-speed processors $6_1$ to $6_x$ in teacher-supervised learning of step S3 are in a predetermined range or not (i.e., whether the learning has been converged or not). If the learning has not yet converged, the process returns to step S3, and teacher-supervised learning is repeated. If the learning has been converged, the learning of the neural network is ended.

Next, the initialization of a weight vector for every category in step S1 and the teacher-supervised learning in step S3 shown in the flow chart of FIG. 3 will be described in more detail.

(A) Initialization of weight vector for each category

The initialization of weight vector for each category is performed by (non-supervised) self-organization learning in each category. The algorithm is as follows:

First, using learning vector numbers i ($1 \leq i \leq N$), category numbers k ($1 \leq k \leq K$) and output node numbers m in the category Ck ($1 \leq m \leq MC$), all of the learning vectors Xi are normalized by expression (1):

$$Xi = Norm(Xi) \qquad (1)$$

where Norm(D) is a function for normalizing a vector D using a unit vector (a vector of Norm "1"). An example of such a function is a function for obtaining a vector which is composed of elements Di represented by the expression:

$$Di = Di / \sqrt{(\Sigma Di \times Di)}.$$

Then, a learning vector Xkj belonging to an arbitrary category Ck is input into the input node 2. If the result satisfies:

$$O\{Xkj(t1), Wkc(t1)\} = \max_m [O\{Xkj(t1), Wkm(t1)\}]$$

where t1: the number of self-organization learning procedures ($0 \leq t1 \leq T1$), O{E, F}: the degree of similarity between a vector E and a vector F, for example, $$O\{E, F\} = \sum_n (En \cdot Fn),$$

Xkj: the jth learning vector which belongs to the kth category Ck,

Wkm: a weight vector corresponding to the mth output node in the category Ck,

Wkc: a weight vector which exhibits the greatest degree of similarity with the learning vector Xkj in the category Ck, Nc: a set of weight vector numbers in a predetermined area provided in the vicinity of the weight vector Wkc, and A(t1): a function the value of which decreases with the increase of t1 ($0 < A(t1) < 1$), for example, $A(t1) = C \times (1 - t1/T1)$ (where C: constant and t1: $0 \leq t1 < T1$), then the value of the weight vector Wkm is changed by following expressions (2) or expression (4).

For m (m ∈ Nc(t1)):

$$Wkm(t1+1) = Wkm(t1) + A(t1) \times \{Xkj(t1) - Wkm(t1)\} \qquad (2)$$

Then, the changed weight vector Wkm(t1+1) is normalized by expression (3):

$$Wkm(t1+1) = Norm(Wkm(t1+1)) \qquad (3)$$

For other m:

$$Wkm(t1+1) = Wkm(t1) \qquad (4)$$

As described above, self-organization learning within a category is performed as follows: a learning vector Xkj which belongs to a category Ck is input, then the contents of a weight vector Wkm (M ∈ Nc(t1)) which is positioned in a predetermined area Nc(t1) set in the vicinity of the weight vector Wkc which has the greatest degree of similarity with respect to the learning vector Xkj in the category Ck are changed, so that the difference (Xkj−Wkm) between the weight vector Wkm and the learning vector Xkj is reduced. In this manner, learning is repeatedly performed, and the contents of the weight vector Wkm become similar to those of the learning vector Xkj. As a result, the information of the category Ck to which the learning vector Xkj belongs is mapped onto the weight vector Wkm system.

Figure 4:
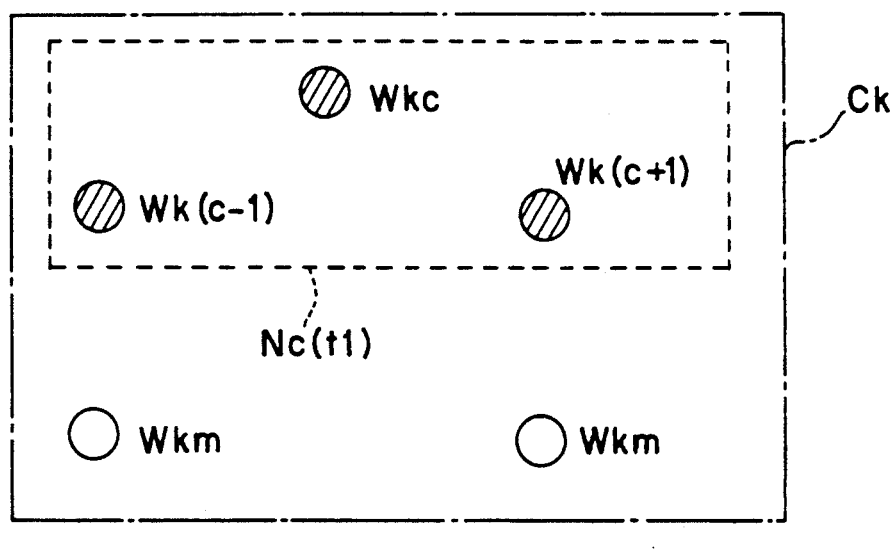
FIG. 4 diagrammatically illustrates a predetermined area Nc(t1) associated with a weight vector Wkc.

In this embodiment, the change or update of the weight vector Wkm by expression (2) is carried out in the following manner. As shown in FIG. 4, five weight vectors Wkm ($1 \leq m \leq 5$) correspond to five output nodes 1 km ($1 \leq m \leq 5$) in the category Ck. Among five weight vectors Wkm, a weight vector Wkc, a weight vector Wk(c+1) allocated with a larger number by "1", and a weight vector Wk(c−1) allocated with a smaller number by "1" are positioned within the predetermined area Nc(t1). In other words, "m" in the expression (m ∈ Nc(t1)) is selected as (c−1), c and (c+1). The degrees of changing or updating the weight vectors Wkc, Wk(c−1) and Wk(c+1) in the predetermined area Nc(t1) are selected so that the degree of changing the weight vector Wkc which shows the greatest degree of similarity with respect to the learning vector Xkj is greatest, and the degrees of the other weight vectors Wk(c−1) and Wk(c+1) monotonously decrease. Practically, the weight vectors Wk(c−1), Wkc and Wk(c+1) are changed or updated by the following expressions.

$$Wk(c-1)(t1+1) = Wk(c-1)(t1) + \qquad (2\text{-}1)$$
$$A(t1) \times [1 - O\{Xkj(t1), Wkc(t1)\}] \times$$
$$\{Xkj(t1) - Wk(c-1)(t1)\}$$

$$Wkc(t1+1) = Wkc(t1) + A(t1) \times \{Xkj(t1) = Wkc(t1)\} \qquad (2\text{-}2)$$

$$Wk(c+1)(t1+1) = Wk(c+1)(t1) + \qquad (2\text{-}3)$$
$$A(t1) \times [1 - O\{Xkj(t1), Wkc(t1)\}] \times$$
$$\{Xkj(t1) - Wk(c+1)(t1)\}$$

Thus, the contents of the weight vector Wkc in the predetermined area Nc(t1) are made to be much closer to the contents of the learning vector Xkj, and the contents of the neighboring weight vectors Wk(c−1) and Wk(c+1) in the predetermined area Nc(t1) are made to be somewhat closer to the contents of the learning vector Xkj.

In this way, the predetermined area Nc(t1) is defined so as to be centered at the weight vector Wkc which has the greatest degree of similarity with respect to the learning vector Xkj, and the contents of the weight vectors Wkc, Wk(c−1) and Wk(c+1) in the predetermined area $Nc(t1)$ are changed or updated. Due to this change or update, even if a learning vector of a wrong (or extremely peculiar or noisy) learning pattern is first presented in self-organization learning, the wrong learned result can be corrected by self-organization learning using the correct learning vectors which are input later.

As a result of self-organization learning, common features in a plurality of learning vectors $Xkj$ which have the greatest degree of similarity with respect to the weight vector $Wkc$ are mapped onto the weight vector $Wkc$. This means that a plurality of learing vectors $Xkj$ which have the greatest degree of similarity with respect to the weight vector $Wkc$ are clustered into one cluster, and the value of the weight vector $Wkc$ is a respresentative vector of this cluster.

When the change or update of the weight vector $Wkm$ for all the j learning vectors in one category $Ck$ is completed, a plurality of learning vectors $Xkj$ which belong to the category $Ck$ are clustered in clusters the number of which corresponds to the number of the output nodes $Lkm$ (5 in this embodiment) allocated to the category $Ck$. As a result of this clustering, the five weight vectors $Wkm$ corresponding to the five output nodes $Lkm$ allocated to the category $Ck$ become representative vectors of the respective clusters. Therefore, when self-organization learning in one category $Ck$ is completed, initial values of the five weight vectors $Wkm$ corresponding to the five output nodes $Lkm$ in the category $Ck$ are automatically set to be the representative vectors of the respective clusters.

When the change or update of weight vectors $Wkm$ for all the categories $Ck$ has been completed in a similar manner, the representative vector for each category $Ck$ which has been obtained as a result of clustering the respective category $Ck$ is set to be an initial value of the corresponding weight vector $Wkm$.

(B) Teacher-supervised Learning

In the Kohonen type neural network, after all the initial values of the weight vectors $Wkm$ have been set as described above, teacher-supervised learning is carried out, so that the contents of each weight vector $Wkm$ are changed or updated again in order to correctly identify a category $Ck$ to which a learning vector $Xkj$ belongs.

Various learning methods for teacher-supervised learning of the Kohonen type neural network are known. According to the embodiment, a learning method is provided in which, even if the number of learning vectors which belong to one category is small, teacher-supervised learning is efficiently performed using LVQ2.

In the Kohonen type neural network shown in FIG. 1, when a learning vector $Xkj$ which belongs to a category $Ck$ is input into an input node 2, an output value $Okm$ from an output node $Lkm$ is obtained by expression (5):

$$Okm = Xkj \times Wkm \quad (5)$$

The teacher-supervised learning method in this embodiment includes three learning processes. The first and second learning processes are performed when the output node which outputs a maximum value when inputting the learning vector $Xkj$ into the input node 2 is not allocated to the category $Ck$ to which the learning vector $Xkj$ belongs. The third learning process is performed after the first and second learning processes have been finished, so as to further enhance the identification ability of the neural network. These learning processes will be described below.

(a) First Learning Process

The first learning process utilizes the LVQ2 which is known as a teacher-supervised learning method for a Kohonen type neural network.

The maximum output value among output values from the output nodes $Lkm$ obtained when inputting the learning vectors $Xkj$ which belong to the category $Ck$ into the input node 2 is represented by $Ok_1m_1$, and the second maximum output value by $Ok_2m_2$. If $$k_1 \neq k \text{ and } k_2 = k,$$

the values of the weight vectors $Wk_1m_1$ and $Wk_2m_2$ are respectively changed or updated by the following expressions:

$$Wk_1m_1(t3 + 1) = Wk_1m_1(t3) - \quad (6)$$
$$B(t3) \times \{Xkj - Wk_1m_1(t3)\}$$

$$Wk_2m_2(t3 + 1) = Wk_2m_2(t3) - \quad (7)$$
$$B(t3) \times \{Xkj - Wk_2m_2(t3)\}$$

where
- $t3$: the number of the first learning processes,
- $k_1$: the number of the category in which the output node outputting the maximum value is included,
- $m_1$: the number of the output node which outputs the maximum value in the $k_1$th category,
- $k_2$: the number of the category in which the output node outputting the second maximum value is included,
- $m_2$: the number of the output node which outputs the second maximum value in the $k_2$th category, and
- $B(t3)$: a function the value of which decreases with the increase of the number of learning processes $t3$, for example, $0.1 \times (1 - t3/T3)$ (T3: the maximum number of first learning processes).

As described above, in the first learning process, when the identified result based on the output node which outputs the maximum value is wrong, and when the identified result based on the output node which outputs the second maximum value is correct, the value of the weight vector $Wk_1m_1$ for the output node $Lk_1m_1$ is made to be smaller, and the value of the weight vector $Wk_2m_2$ for the output node $Lk_2m_2$ is made to be larger. As a result, the category $Ck$ to which the learning vectors $Xkj$ belong can be identified based on the maximum output value.

(b) Second Learning Process

If the identified result based on the output node which outputs the maximum value remains wrong after repeating the first learning process predetermined times ($T_3$), learning is continued using the following expressions.

$$Wk_1m_1(t4 + 1) = Wk_1m_1(t4) - \quad (8)$$
$$B(t4) \times \{Xkj - Wk_1m_1(t4)\}$$

$$Wk_2m_2(t4 + 1) = Wk_2m_2(t4) - \quad (9)$$
$$B(t4) \times \{Xkj - Wk_2m_2(t4)\}$$

where
t4: the number of the second learning processes, and
B(t4): a function the value of which decreases with the increase of the number of learning processes t4.

In the second learning process, learning is continued until the identified result based on the output node which outputs the maximum value becomes correct. As a result, the neural network can output the maximum value from one of the output nodes Lkm in the category Ck to which the learning vector Xkj belongs. Then, the third learning process described below is carried out.

(c) Third Learning Process

In the third learning process, the values of the weight vectors Wkm which are set so as to correctly identify the categories to which all of the learning vectors Xi belong in the first and second learning processes are changed or updated by expressions (10) and (11) in order to enhance the identification ability.

Among the output values Okm from the output nodes Lkm for the input learning vectors Xkj which belong to the category Ck, the maximum output value is represented by $Ok_1m_1$, and the second maximum output value is represented by $Ok_2m_2$. If $k_1=k$, $k_2 \neq k$, and $Ok_2m_2/Ok_1m_1 > R$ (R: a constant equal to or smaller than 1 (e.g., 0.9)), the values of the weight vectors $Wk_1m_1$ and $Wk_2m_2$ are changed or updated by the following expressions, respectively.

$$Wk_1m_1(t5 + 1) = Wk_1m_1(t5) - \quad (10)$$
$$B(t5) \times \{Xkj - Wk_1m_1(t5)\}$$

$$Wk_2m_2(t5 + 1) = Wk_2m_2(t5) - \quad (11)$$
$$B(t5) \times \{Xkj - Wk_2m_2(t5)\}$$

where
t5: the number of third learning processes, and
B(t5): a function the value of which decreases with the increase of the number of learning processes t5.

In this third learning process, after the first and second learning processes have been completed, the values of the weight vectors Wkm are changed or updated in such a manner that the maximum output value of the output node Lkm in the category Ck to which the learning vectors Xkj belong is made larger and the maximum output value of the output node in the category to which the learning vectors Xkj do not belong is made smaller. As a result of performing the third learning process, the ability of identifying the category attained in the first and second learning process is further enhanced. Accordingly, even if learning is carried out with a small number of learning vectors, or even if learning is carried out with limited pattern variations of learning vectors in one category, a category to which various unlearned input vectors belong can be identified correctly.

In this process, the initial values of the weight vectors in the neural network are set to be representative vectors of respective clusters obtained by clustering the learning vectors through self-organization learning in each category. Therefore, the number of learning processes T2 (=T3+T4+T5) required until the teacher-supervised learning is converged can be greatly reduced. The clustering of the learning vectors is carried out in the learning process of the neural network, so that the clustering and the teacher-supervised learning are carried out in the course of learning operation. Therefore, it is not necessary to use another algorithm for clustering learning vectors or another process for initializing values of weight vectors using the representative vectors for the respective clusters. Consequently, the learning of the neural network can be accomplished by a very simply procedure.

Figure 5:
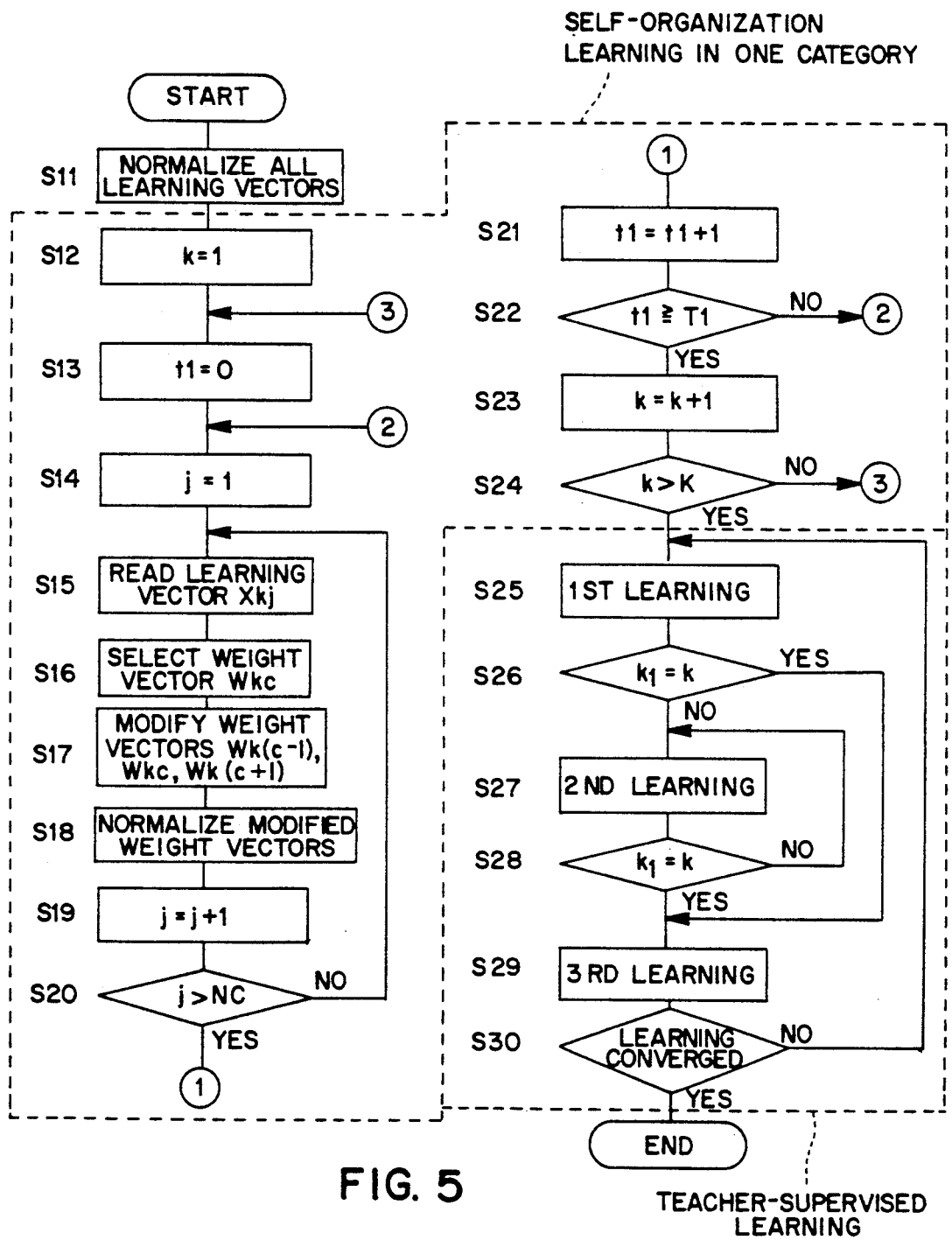
FIG. 5 is a flow chart illustrating the flow chart shown in FIG. 3 in more detail.
Figure 6A:
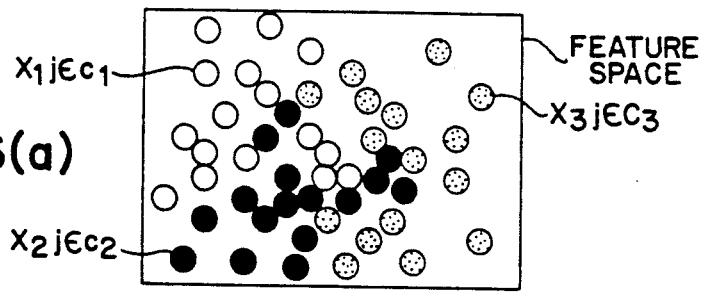
FIGS. 6A to 6D are diagrams illustrating a concept of a learning process.
Figure 6B:
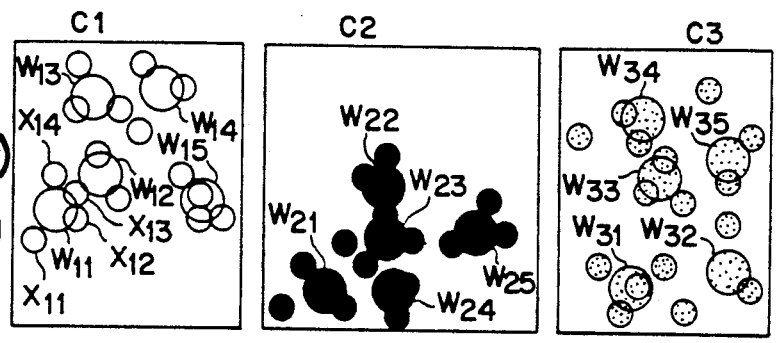
Figure 6C:
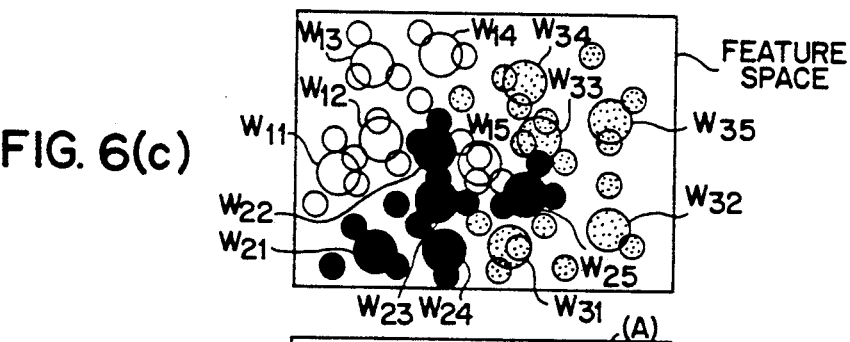
Figure 6D:
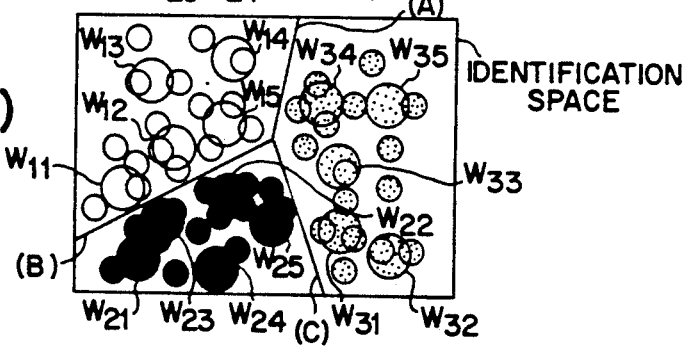

FIG. 5 is a schematic flow chart illustrating the learning operation of FIG. 3 in more detail.

In step S11, all the learning vectors are normalized by expression (1).

In step S12, a value "1" is set as the initial value of the category number k.

In step S13, a value "0" is set as the initial value of the number of self-organization learning procedures t1.

In step S14, a value "1" is set as the initial value of the learning vector number j in the kth category Ck.

In step S15, the jth learning vector Xkj in the category Ck is read out.

In step S16, the weight vector Wkc which has the greatest degree of similarity $O\{Xkj(t1), Wkc(t1)\}$ is selected.

In step S17, the contents of the weight vectors Wkm (m: $m \in Nc(t1)$) are changed or updated by expression (2). As shown in FIG. 4, m ($m \in Nc(t1)$) is selected as (C−1), c and (c+1), and the contents of the weight vectors Wk(c−1), Wkc and Wk(c+1) are changed or updated by expressions (2-1), (2-2) and (2-3), respectively.

In step S18, the weight vectors Wk(c−1), Wkc and Wk(c+1) updated in step S17 are normalized by expression (1).

In step S19, the learning vector number j in the category Ck is incremented by one.

In step S20, it is judged whether the number j is larger than the number "NC" of the learning vectors in the category Ck or not. If the number j is larger than "NC", the process proceeds to step S21. If not, the process returns to step S15, and the process for the next learning vector in the category Ck is carried out.

In step S21, the number of learning processes t1 is incremented by one.

In step S22, it is judged whether the number t1 is equal to or larger than the maximum number of self-organization learning processes "T1" or not. If YES, the process proceeds to step S23. If NO, the process returns to step S14, and the next self-organization learning process is carried out.

In step S23, the category number k is incremented by one.

In step S24, it is judged whether the category number k is equal to or larger than the number of categories "K" or not. If YES, the process proceeds to step S25. If NO, the process returns to step S13, and the process for the next category is carried out. It will be apparent that step S24 in FIG. 5 corresponds to step S2 shown in FIG. 3.

In step S25, teacher-supervised learning is started. In this step, the first learning process is carried out in accordance with expressions (6) and (7). Since the operation procedure of the first learning process is substantially similar to that of the above-mentioned self-organization learning, a detail flow chart of the operation procedure of the first learning process is not described here. For the same reason, the description of the second and third learning processes is also omitted.

In step S26, it is judged whether the category to which the output node having the maximum output value is allocated is the same category to which the input learning vectors belong or not, in other words, whether $k_1$ is equal to k or not. If $k_1$ is not equal to k, the process proceeds to step S27. If $k_1$ is equal to k, step S27 is skipped.

In step S27, the second learning process is carried out in accordance with expressions (8) and (9).

In step S28, it is judged whether $k_1$ is equal to k or not, again. If $k_1$ is equal to k, the process proceeds to step S29. If $k_1$ is not equal to k, the process returns to step S27, and the second learning process is performed again.

In step S29, the third learning process is carried out in accordance with expressions (10) and (11).

In step S30, it is judged whether the learning is converged or not. If NO, the process returns to step S25, and the teacher-supervised learning is continued. If YES, the learning of the neural network is ended.

FIG. 6 shows a concept of the learning process according to this embodiment. In (a) of FIG. 6, pattern features of the learning vectors Xi are shown in a two-dimensional feature space. All of the pattern features of the learning vectors Xi belong to any one of the three categories C1, C2 and C3. Each of the categories C1, C2 and C3 has sixteen learning vectors Xkj ($1 \leq j \leq 16$). In the figure, plain circles indicate learning vectors X3j which belong to the category C1, hatched circles indicate learning vectors X2j which belong to the category C2, and dotted circles indicate learning vectors X3j which belong to the category C3.

In (b) of FIG. 6, the manner of clustering the learning vectors Xkj which belong to respective categories into five clusters is shown. This clustering is performed by the self-organization learning process in each category which is carried out through steps S14 to S20 of the flow chart shown in FIG. 5. As seen from the figure, five output nodes are allocated to one category. Among the sixteen learning vectors X1j ($1 \leq j \leq 16$) in the category C1, the learning vectors X11, X12, X13 and X14 which are positioned close to each other in the feature space are clustered into one cluster, so that a weight vector W11 is self-organized as a representative vector of the cluster. In the same manner, four weight vectors W12, W13, W14 and W15 are self-organized as representative vectors of the other clusters, respectively. In each of the categories C2 and C3, the learning vectors are similarly clustered into five clusters, and weight vectors W21, W22, W23, W24 and W25, and W31, W32, W33, W34 and W35 are self-organized as representative vectors of the respective clusters.

The diagram shown in (c) of FIG. 6 illustrates the position of all weight vectors W11 to W35 in the feature space which are self-organized as a result of the self-organization learning in each of categories C1, C2 and C3. In (c) of FIG. 6, the weight vector W15 of the category C1 is positioned in a feature area which is defined by the weight vectors of the category C2 in the feature space. Similarly, the weight vector W25 of the category C2 is positioned in a feature area for the category C3, and the weight vector W31 of the category C3 is positioned in a feature area for the category C2. This makes it impossible to clearly define boundaries for the feature area in the feature space, so that the pattern features of the input vectors are not always correctly identified if identification is performed based on the weight vectors shown in (c) of FIG. 6.

Then, using the contents of the weight vectors shown in (c) of FIG. 6 as initial values of the respective weight vectors of the neural network, teacher-supervised learning of the neural network is performed. In this learning, the contents of the weight vectors are changed or updated so as to enhance the identification accuracy (i.e., the degree of correctly identifying a category), thereby adjusting the positions of the weight vectors for each category. Thus, an artificial space for correctly identifying the three categories C1, C2 and C3 is formed as shown in (d) of FIG. 6.

In this artificial space for identification, the weight vectors W11 to W15, W21 to W25, and W31 to W35 allocated in each of the categories C1, C2 and C3 are transposed appropriately so as to form one identification area for each of the categories, thereby clearly defining the boundaries for identification (A), (B) and (C) of the categories C1, C2 and C3. Therefore, after the teacher-supervised learning, the neural network can identify correctly the categories, based on the boundaries for identification (A), (B) and (C).

FIGS. 7 and 8 show the contents of each of the weight vectors of one example in the Kohonen type neural network shown in FIG. 1 which has been learned using learning characters for printed character recognition, as described above. Three Japanese or Chinese characters (Kanji characters) " (Dai)" (meaning "big"), " (Inu)" (meaning "a dog"), and " (Futoi)" (meaning "fat") are used as the learning characters in the above-mentioned learning process (i.e., the number of categories k is 3). In each category, 28 different fonts are used.

For example, using character image information in a 32×32 mesh which is normalized for each learning character, 1024-dimension learning vectors are produced. The 1024-dimension learning vectors are input into the input node 2 as shown in FIG. 1, and learning is carried out.

Figure 7A:
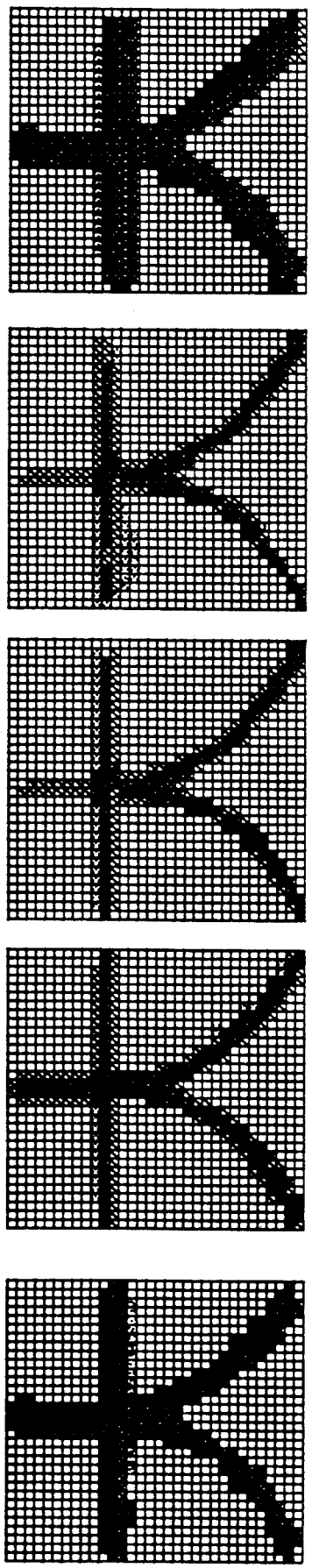
FIGS. 7A to 7C illustrate the contents of weight vectors when self-organization learning has been completed.
Figure 7B:
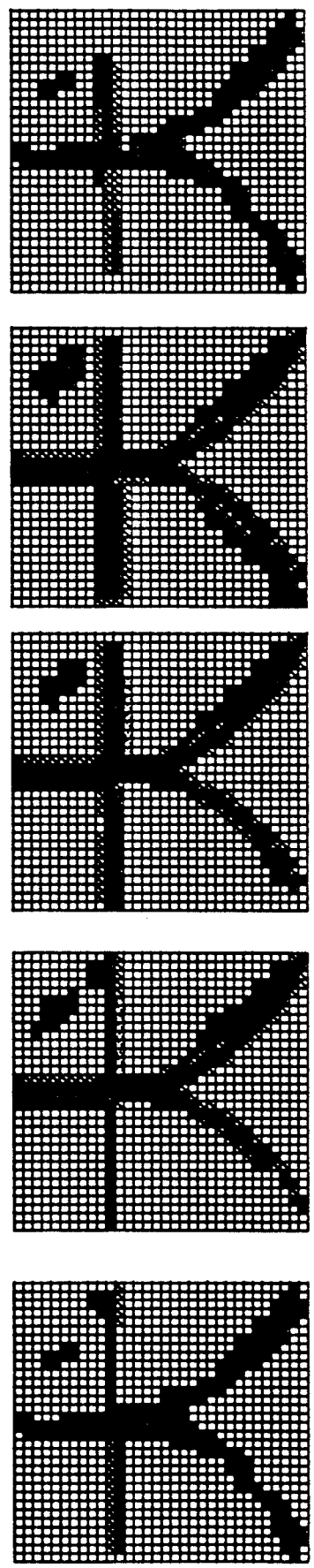
Figure 7C:
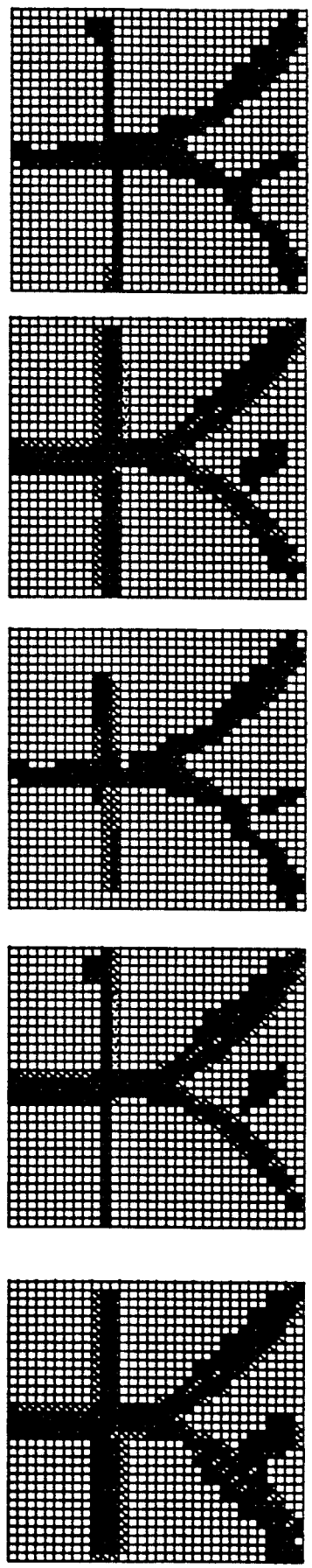

FIGS. 7A to 7C show the contents of the representative vectors (i.e., weight vectors) for respective clusters. These representative vectors are obtained in such a manner that, using the 28 kinds of learning vectors of each category, self-organization learning in each category is carried out for the neural network to cluster the 28 different fonts. In FIG. 7A, the values of the 1024 element which constitute representative vectors of respective five clusters clustered by self-organization learning in the category " (Dai)" are shown in a 32×32 mesh. The representative vectors are five weight vectors corresponding to five output nodes 11m assigned to the category " (Dai)" (k=1). In FIG. 7, the darker mesh indicates an element value activated to a higher degree in self-organization learning (i.e., having a larger value). As seen from this figure, the 28 kinds of learning vectors in the category " (Dai)" are clustered into five typical fonts. In FIG. 7, for the sake of simplification, respective element values are simply shown by three degrees of activation.

Similarly, FIG. 7B shows the values of the elements which constitute representative vectors of respective five clusters of the category " (Inu)" (K=2), and FIG. 7C shows the values of the elements which constitute representative vectors of respective five clusters of the category " (Futoi)" (K=3). Either figure shows that the 28 kinds of learning vectors which belong to either category " (Inu)" or " (Futoi)" are clustered into five typical fonts.

Figure 8A:
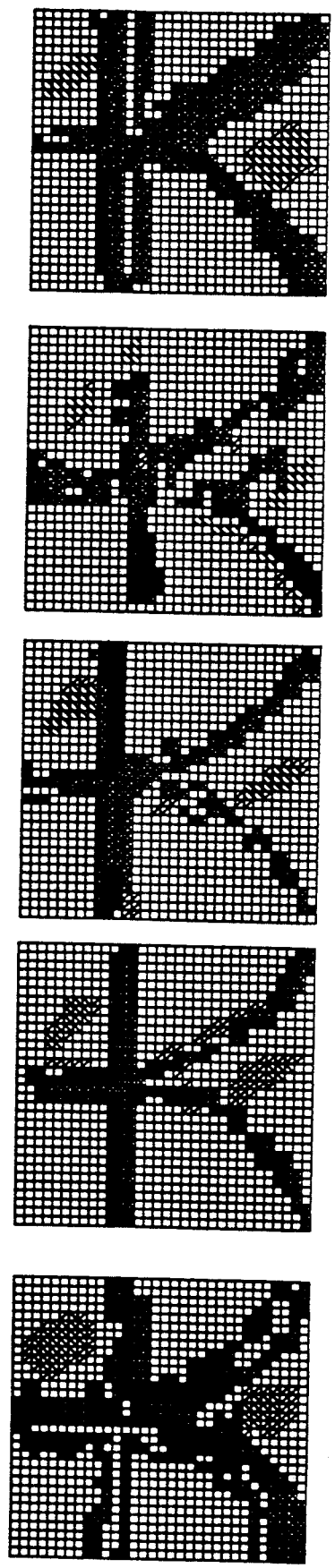
FIGS. 8A to 8C illustrate the contents of weight vectors when teacher-supervised learning has been completed.
Figure 8B:
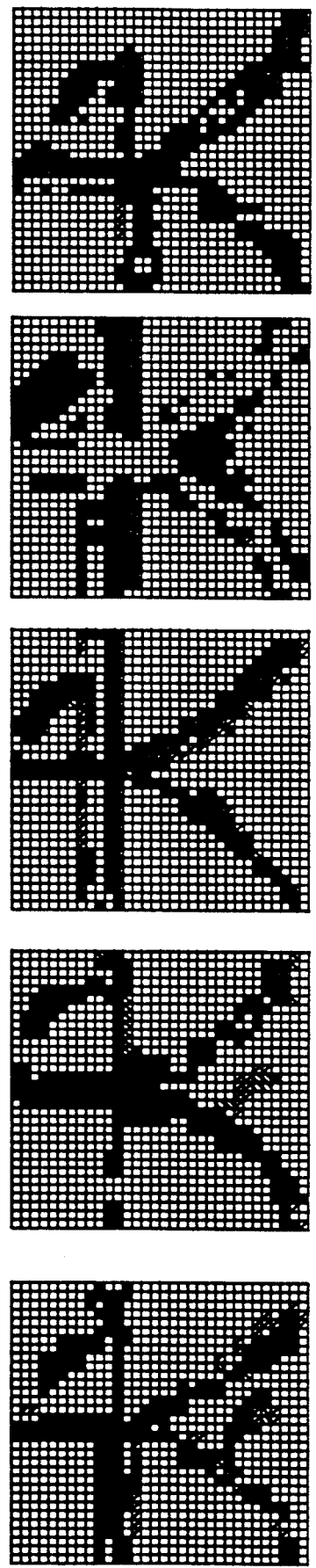
Figure 8C:
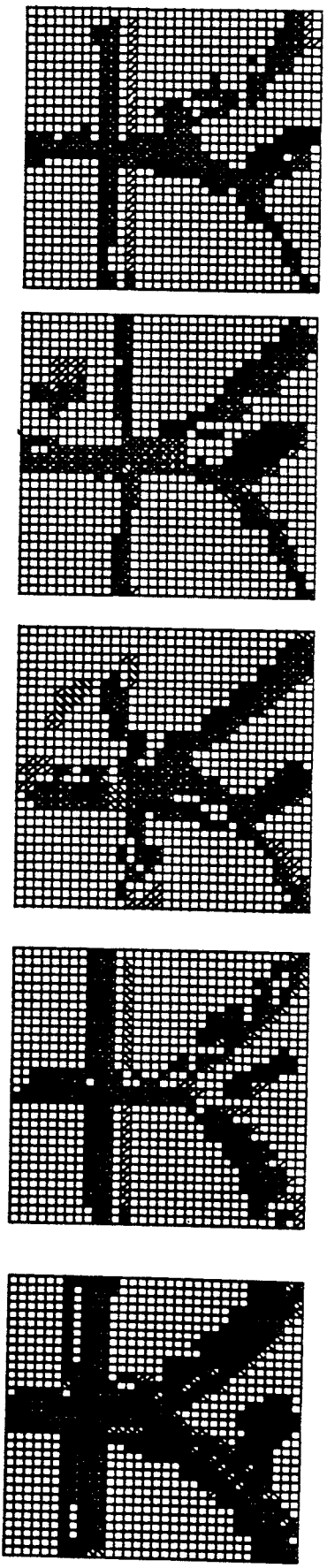

FIGS. 8A to 8C show the contents of the weight vectors obtained when, after self-organization learning in each category has been conducted, teacher-supervised learning is carried out for the neural network and the learning is converged. In FIG. 8A, the values of the 1024 elements which constitute each of five weight vectors W1m corresponding to five output nodes 11m assigned to the category " (Dai)" (k=1) are shown in a 32×32 mesh. In FIG. 8, hatched meshes indicate inhibitory element values (negative element values) in the weight vectors Wkm, and black meshes and cross-hatched meshes indicate excitatory element values.

As seen from FIG. 8A, the weight vectors W1m corresponding to the respective output nodes 11m in the category " (Dai)" (k=1) are changed or updated so that the element values of weight vectors which are positioned in the upper right of the character image " (Inu)" or in the bottom center of the character image " (Futoi)" where a dot " " exists become inhibitory. Since the contents of the weight vectors are set as described above, the weight vectors W1m corresponding to the output nodes 11m in the category " (Dai)" serve in recognition to inhibit the element values of the input vectors corresponding to the position of the above-mentioned dot " ", based on the character image to be identified. In these figures, for the sake of simplification, inhibition or excitation is indicated by two degrees.

Similarly, FIG. 8B shows the 1024 element values which constitute respective five weight vectors W2m corresponding to five output nodes 12m allocated to the category " (Inu)" (k=2). As seen from this figure, the weight vectors W2m corresponding to the respective output nodes 12m in the category " (Inu)" (k=2) are changed or updated so that the element values of the weight vectors which are positioned in the upper right where the dot " " of the character image " (Inu)" exists become excitatory. It will be understood from FIG. 8C that the weight vectors W3m corresponding to the respective output nodes 13m in the category " (Futoi)" (k=3) are changed or updated so that the element values of the weight vectors which are positioned in the bottom center where the dot " " of the character image " (Futoi)" exists become excitatory.

Namely, as seen from FIG. 8, in the space for identification (see (d) of FIG. 6), the three Kanji characters " (Dai)", " (Inu)" and " (Futoi)" are identified based on the judging points of whether a dot " " exists or not and where the dot is. This way of identification is similar to the way that a person distinguishes among the three Kanji characters visually in accordance with the position of the dot " ".

In other words, the element values respectively corresponding to the cross-hatched, hatched, and dotted meshes in FIGS. 7A to 7C are learned by self-organization learning in each category, without examining the relations between the categories. The inhibitory element values corresponding to the hatched meshes in FIG. 8 are learned as the value representing the difference between the categories by teacher-supervised learning.

If, in teacher-supervised learning, the initial value of a weight vector is set to a random value as is the case in a conventional method, the number of calculations becomes very large, because the element value corresponding to the black or cross-hatched mesh which indicates little difference between the categories of FIG. 8 is learned while examining the relations between the categories.

The reduction in the number of calculations in learning for the neural network according to this embodiment will be described by comparing a case where an initial value of each weight vector was set by self-organization learning, with a conventional case where a random value was set as an initial value of each weight vector. In both cases, a Kohonen type neural network was used in the following conditions:

Number of categories for objects to be identified: $K=100$,

Number of weight vectors (output nodes) for one category: $MC=5$,

Number of learning vectors for one category: $NC=20$, and

Whole number of learning vectors: $N=2000$.

In the case where the initialization was conducted using a random value, the number of teacher-supervised learning processes required until the convergence was 37 ($T2'=37$), and the recognition rate was 99, 95%. The total number of calculations (P1) is represented by $$MC \times K \times N \times T2'$$

In the case where the initialization was conducted with self-organization learning, the maximum number of self-organization learning processes was 50 ($T1=50$), the number of teacher-supervised learning processes required until the convergence was 9 ($T2=9$), and the recognition rate was 99, 95%. The total number of calculations (P2) is represented by $$P2 = (MC \times NC \times T1 \times K) + (MC \times K \times N \times T2)$$

Accordingly, $$\begin{aligned} P2/P1 &= (NC \times T1 + N \times T2)/(N \times T2') \\ &= 0.26 \end{aligned}$$

As seen from above, the number of calculations required for the neural network can be greatly reduced to one-fourth as compared with the number of calculations in the case where the weight vector is initialized using a random value.

In this embodiment, when performing learning for a neural network as described above, a plurality of learning vectors which belong to an arbitrary category are used, and self-organization learning in the category is carried out. As a result, the plurality of learning vectors which belong to the category are automatically clustered, and the contents of weight vectors in the neural network are set to representative vectors which exhibit common features of the learning vectors of each cluster. Then, teacher-supervised learning is carried out for the neural network, using the thus set contents of the weight vectors as initial values thereof. In the leaning process, an initial value of each weight vector is set to the representative vector of each cluster obtained by clustering. Therefore, the number of calculations required until the teacher-supervised learning is converged is largely reduced.

The clustering of the learning vectors and initialization of the weight vectors are automatically carried out by self-organization learning in the learning process over the Kohonen type neural network. Thus, unlike the conventional method, it is not required that clustering of learning vectors is performed by an algorithm which is quite different from a learning algorithm of the neural network, and that the thus obtained representative vector is set as an initial value of the weight vector of the neural network.

According to this embodiment, clustering of learning vectors, initialization of weight vectors using representative vectors of respective clusters and learning of a neural network can be automatically and readily carried out.

The teacher-supervised learning in this embodiment is performed through the first, second, and third learning processes. According to the invention, the manner of performing the teacher-supervised learning is not restricted to the above. For example, the third learning process may be omitted. Moreover, an algorithm of the self-organization learning in the category is not limited to the algorithm shown in the above embodiment.

In the algorithm of self-organization learning in each category shown in the first embodiment, the contents of the weight vectors Wk(c−1), Wkc and Wk(c+1) in the predetermined area NC formed in the vicinity of the weight vector Wkc which has the greatest degree of similarity with the input learning vector Xkj are changed or updated by expression (2) (i.e., by expressions (2=1), (2=2) and (2=3)). After performing self-organization learning, in the vicinity of the weight vector which represents a representative vector of one cluster of the learning vectors, weight vectors which represent representative vectors of clusters similar to the cluster are self-organized. Thus the degrees of similarity between the clusters have a peak at the weight vector which represents a representative vector of the cluster.

According to the invention, however, self-organization learning is performed in order to cluster the weight vectors and set the initial value of the weight vector to a representative vector of each cluster. Thus, it is not necessary to set the contents of neighboring weight vectors to the representative vector of a cluster which exhibits a greater degree of similarity.

In another embodiment, therefore, the algorithm of self-organization learning in each category of the first embodiment is as follows:

$$Wkc(t1 + 1) = Wkc(t1) + A(t1) \times \{Xkj(t1) - Wkc(t1)\} \quad (2')$$

As seen from this expression, only the contents of the weight vector Wkc which has the greatest degree of similarity with the input learning vector Xkj are changed or updated.

Using expression (2'), the number of calculations required in one self-organization learning can be reduced to one, while in the first embodiment three calculations must be performed using expressions (2-1), (2-2) and (2-3). According to this embodiment, therefore, much higher-speed processing can be attained.

Then, normalization of the thus changed or updated weight vectors and teacher-supervised learning are performed in the same manner as that in the first embodiment.

As described above, in the second embodiment, the algorithm of the self-organization learning in the first embodiment is modified such that only the contents of the weight vector Wkc which has the greatest degree of similarity with the input learning vectors Xkj are changed or updated, whereby the number of calculations can be further reduced.

In the modified algorithm, when the learning vectors initially presented in self-organization learning are wrong learning vectors (for example, learning vectors based on the Kanji character " (Ki)" (meaning "a tree") in self-organization learning for the category " (Dai)"), extremely peculiar learning vectors, noisy learning vectors, etc., the weight vector which exhibits the greatest degree of similarity is not always changed or updated by the correct learning vectors which are input later. This means that the wrong learning is not corrected. Accordingly, in the learning process in the neural network according to this embodiment, it is required that wrong, extremely peculiar, or noisy learning vectors are not presented initially in the self-organization learning.

A further embodiment of the invention will be described. In the third embodiment, self-organization learning in each category and teacher-supervised learning for the categories are performed simultaneously, or either of the self-organization learning and teacher-supervised learning is selectively performed.

Figure 9:
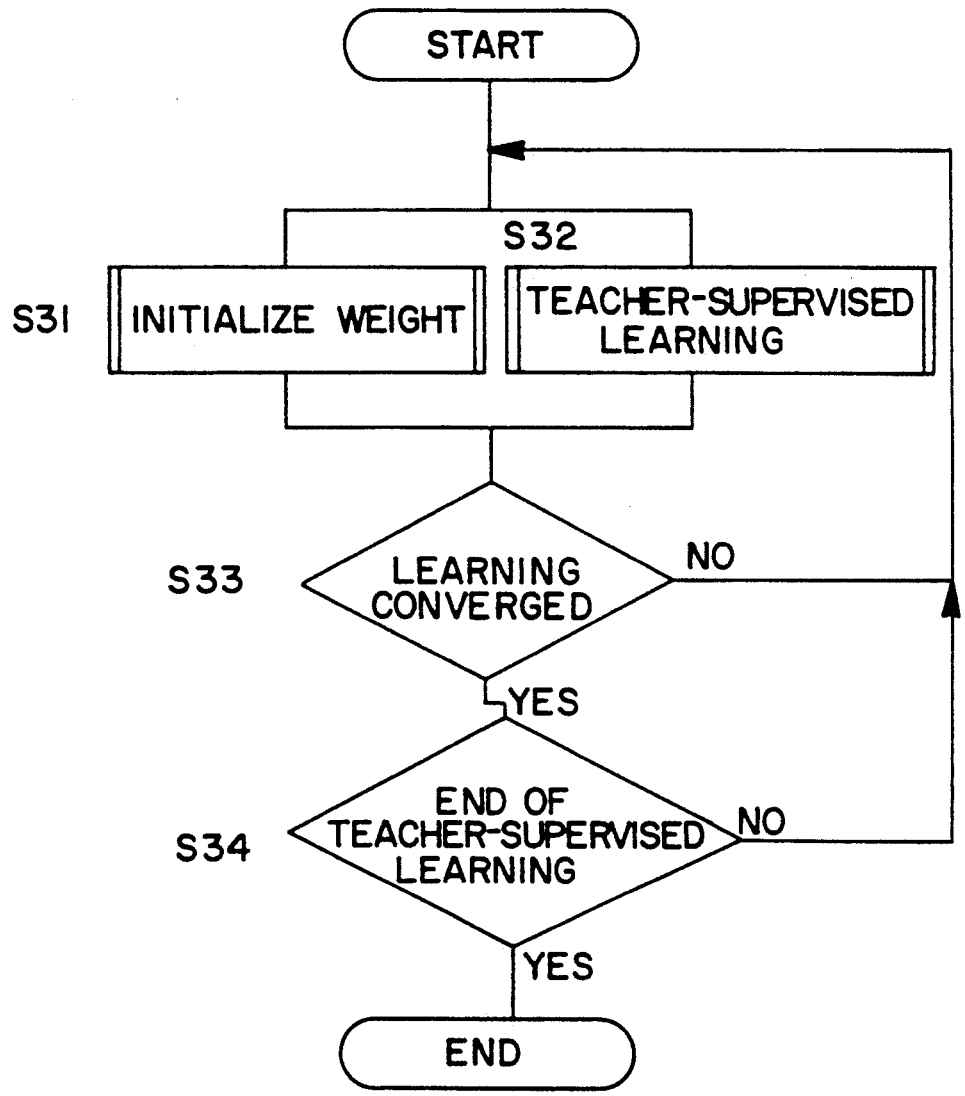
FIG. 9 is a flow chart illustrating a learning operation of a different example from that of FIG. 3.

FIG. 9 shows a flow chart of a learning operation according to this embodiment.

In step S31, self-organization learning is carried out in an arbitrary category among a plurality of categories to which the learning vectors belong, and a set of learning vectors which belong to the category is clustered. Then, the weight vectors in the category are initialized to be representative vectors of the respective clusters obtained.

In step S32, teacher-supervised learning is carried out for all the weight vectors which have been initialized in step S31.

Through these steps, weight vectors are adjusted to each other in the category to which the weight vectors newly initialized belong and the category to which the weight vectors previously learned in teacher-supervised learning belong. Steps S31 and S32 are selectively controlled by the CPU 3 to perform either both the steps or just one of the steps.

In step S33, it is judged whether the teacher-supervised learning is converged or not. If NO, the process returns to step S32, and the teacher-supervised learning is continued. If YES, the process proceeds to step S34.

In step S34, it is judged whether the teacher-supervised learning for all categories has been completed or not. If NO, the process returns to step S31 so as to perform self-organization learning in the next category, and at the same time teacher-supervised learning is performed in step S32. If YES, the learning for the neural network is ended.

As described above, self-organization learning in which clustering of learning vectors which belong to an arbitrary category and initialization of weight vectors are performed, and teacher-supervised learning for all the weight vectors which have been initialized are performed simultaneously, or either of the two learning processes is selectively performed. The self-organization learning and the teacher-supervised learning may be carried out by, for example, the method used in the first embodiment.

The procedure of the present embodiment is effectively used in learning of a neural network in which a large number of Kanji characters (e.g., 7,000 Kanji characters are specified in Japanese Industrial Standard) are to be recognized. For example, self-organization learning is first carried out for the first 1,000 characters among the 7,000 characters, and weight vectors of the first 1,000 characters are initialized. Next, teacher-supervised learning for the first 1,000 characters the weight vectors of which have been initialized, and self-organization learning for the next 1,000 characters are carried out in parallel. Similarly, self-organization learning for 1000 characters and teacher-supervised learning for all the characters which have been initialized in the self-organization learning are carried out in parallel. Accordingly, the learning can be converged in a much shorter period of time, as compared with the learning method of the first embodiment.

As described above, in this embodiment, since the self-organization learning in each category and the teacher-supervised learning performed among the categories are performed simultaneously or selectively, the total period of time required for learning can be greatly reduced.

In each of the above-described embodiments, learning is conducted using a Kohonen type neural network. The invention is not restricted to this, and alternatively, can be applied to a perceptron type neural network. In this case, the output nodes Lkm shown in FIG. 1 may be used as intermediate layer nodes of the perceptron type neural network, and the input node 2 shown in FIG. 1 as an input layer node of the perceptron type neural network. Namely, a plurality of the intermediate layer nodes of the perceptron type neural network are allocated to each of categories of objects to be identified. Then, self-organization learning is performed for the intermediate layer nodes and the input layer node, and weights of the intermediate layer nodes are initialized. Next, teacher-supervised learning such as back-propagation is carried out for the entire neural network in which the weights of the interlayer nodes have been initialized.

As apparent from the above description, according to the invention, self-organization learning in each category of the neural network to be learned is carried out using a plurality of learning vectors which belong to an arbitrary category, and contents of weight vectors in the category are set to representative vectors of respective clusters obtained in clustering the learning vectors in the category. Then, teacher-supervised learning is carried out for the neural network. Thus, the weight vectors of the neural network at the beginning of the teacher-supervised learning are initialized to the contents of the representative vectors of respective clusters. Accordingly, the teacher-supervised learning can be converged by a small number of calculations.

The clustering of the learning vectors and initialization of the weight vectors are carried out in the self-organization learning for each category in the neural network to be learned. Accordingly, the clustering and initialization can be automatically carried out in the course of the learning for the neural network without using a special algorithm or procedure.

According to the invention, by a simple procedure in which learning vectors are input into a neural network to be learned, the clustering of the learning vectors, the initialization of the weight vectors, and the teacher-supervised learning are automatically carried out, whereby the neural network can be in a learned state by the small number of calculations.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. A neural network apparatus comprising self-organization learning means for performing self-organization learning to a plurality of learning vectors in a category to which said learning vectors belong, a plurality of weight vectors defined in said neural network apparatus, said weight vectors being allocated to said category, said self-organization learning means having
    modification means for modifying contents of a predetermined number of said weight vectors which are in a vicinity of one of said learning vectors, toward said one learning vector,
said apparatus further comprising
    an initial contents setting means for setting said modified contents of predetermined number of said weight vectors as initial contents of said predetermined number of said weight vectors,
    teacher-supervised learning means for performing teacher-supervised learning to said learning vectors, using said initial contents.

2. An apparatus according to claim 1, wherein said predetermined number is one.

3. An apparatus according to claim 1, wherein said predetermined number is two or more.

4. An apparatus according to claim 1, wherein said self-organization learning means performs self-organization learning in every category to which said plurality of learning vectors belong.

5. An apparatus according to claim 1, wherein said apparatus comprises a Kohonen type neural network.

6. An apparatus according to claim 5, wherein said apparatus comprises: output nodes allocated to said category; and an input node through which said learning vectors are input.

7. An apparatus according to claim 1, wherein said apparatus comprises a perceptron type neural network.

8. An apparatus according to claim 7, wherein said apparatus comprises: intermediate layer nodes allocated to said category; and input layer nodes through which said learning vectors are input.

9. A method of performing learning in a neural network apparatus, comprising the steps of:
    performing self-organization learning to a plurality of learning vectors in a category to which said learning vectors belong, a plurality of weight vectors defined in said neural network apparatus, said weight vectors being allocated to said category, while modifying contents of a predetermined number of said weight vectors which are in a vicinity of one of said learning vectors, toward said one learning vector;
    setting said modified contents of predetermined number of said weight vectors as initial contents of said predetermined number of said weight vectors; and
    performing teacher-supervised learning to said learning vectors, using said initial contents.

10. A method according to claim 9, wherein said self-organization learning step and said teacher-supervised learning step are conducted simultaneously.

11. A method of performing learning in a neural network apparatus according to claim 9, wherein said teacher-supervised learning step are conducted after said self-organization learning step.

* * * * *